United States Patent [19]

McGinley et al.

[11] Patent Number: 5,037,597

[45] Date of Patent: Aug. 6, 1991

[54] UNLOADING AND ASSEMBLY SYSTEM AND PROCESS FOR INJECTION MOLDING APPARATUS

[75] Inventors: Thomas M. McGinley, Brampton; Gordon T. Mackay, Richmond Hill, both of Canada

[73] Assignee: Husky Injection Molding Systems, Ltd., Bolton, Canada

[21] Appl. No.: 433,220

[22] Filed: Nov. 8, 1989

[51] Int. Cl.⁵ .................................................. B29C 45/42
[52] U.S. Cl. .................................. 264/238; 264/297.2; 264/297.4; 264/334; 425/556; 425/572; 425/588; 425/444
[58] Field of Search .................. 264/238, 297.1, 297.2, 264/297.4, 297.6, 297.8, 334, 335; 425/554, 556, 572, 588, 581, 437, 441, 444, DIG. 60, 517, 436 RM

[56] References Cited

U.S. PATENT DOCUMENTS

| | | | |
|---|---|---|---|
| 3,013,308 | 12/1961 | Armour | 264/238 |
| 3,910,740 | 10/1975 | Rees | 425/242 |
| 3,938,675 | 2/1976 | Rees | 214/6 M |
| 3,966,386 | 6/1976 | Beyer-Olsen et al. | 425/441 |
| 4,204,824 | 5/1980 | Paradis | 425/441 |
| 4,295,815 | 10/1981 | Eltvedt | 425/444 |
| 4,408,981 | 10/1983 | Brown | 425/589 |
| 4,787,841 | 11/1988 | Simon | 425/556 |
| 4,795,124 | 1/1989 | Nagai | 425/554 |

FOREIGN PATENT DOCUMENTS

57-135133 8/1982 Japan .................................. 264/238

Primary Examiner—Jill L. Heitbrink
Attorney, Agent, or Firm—Bachman & La Pointe

[57] ABSTRACT

An injection molding apparatus and process for forming a plurality of first parts and a plurality of complementary second parts during a single molding cycle has a system for removing parts molded during each cycle and for assembling the parts into finished articles. The system includes a plurality of rotatable suction cups for removing the parts and for aligning them with and inserting them into a series of loading ports in a central mold member so as to mate respective ones of the first parts with respective ones of the second parts. The central mold member further has internal chute assemblies for conveying assembled articles away from the mold. A novel system for driving the rotatable suction cups uses a rotatable member mounted to various mold halves and a camming arrangement whereby relative movement of the mold halves during the mold closing and opening motions causes rotation of the suction cups.

25 Claims, 7 Drawing Sheets

UNLOADING AND ASSEMBLY SYSTEM AND PROCESS FOR INJECTION MOLDING APPARATUS

BACKGROUND OF THE INVENTION

The present invention relates to an injection molding apparatus and process for forming an assembled article from two complementary molded parts and, more particularly, to an unloading and assembly system for use in said injection molding apparatus.

Multi-piece articles and the components therefore are often injection molded in stack mold machines. Articles so produced include floppy disk shells, DAD boxes and Petri dishes having a molded base and a molded cover. Stack molds are used because numerous components can be formed in a single cycle. A family stack mold having eight cavities per half is typically used to manufacture Petri dish components. In such a molding system, eight bases and eight covers are molded in a single cycle.

After components are molded, they are removed from a stack mold machine in a number of ways. For example, the components may be removed using a guide rail system such as that shown in U.S. Pat. No. 3,910,740 to Rees. The removed components are then conveyed to an assembly machine such as that shown in U.S. Pat. No. 3,938,675 to Rees for mating one component to another. The assembly machine, in addition to automatically assembling the articles from its components, presents a counted stack of articles for packaging. Where the components being formed are Petri dish components, the conveyor systems are closed so as to reduce potential contamination.

In an alternative removal system, the parts are removed using a robot. The deficiency with this approach is that cycle time is penalized. This occurs because the robot requires a finite amount of mold open or wait time to remove the parts.

In still another system, sterilized air is used to blow molded parts down a vertical guide conduit. U.S. Pat. No. 4,422,998 to Sorenson illustrates this type of system.

Cycle times associated with stack mold machines have been improved through the use of a pivoting part removal device that deposits molded parts in a vertical chute mounted alongside the mold. Pending U.S. patent application Ser. No. 353,243, filed May 17, 1989, to DiSimone illustrates a stack mold system having such a part removal device.

Improvements in cycle time have created other problems however. For example, systems having a shorter cycle times create more components for assembly. As a result, the speed of the associated assembly machine(s) must be increased to keep up with the rate of molding. A typical molding rate is eight sets of article components every six seconds or approximately 80 per minute. At such rates, assembly machines are prone to jamming and somewhat unreliable.

The foregoing problems are complicated during the manufacture of Petri dish components by the need to maintain as much of a sterile environment as possible. Handling methods such as guide rails and robots allow the interior surfaces of both the base and cover components to be exposed to the atmosphere for sufficient periods of time to reduce their sterility. As a result, the components must be sterilized after assembly. This is typically done by subjecting the assembled and packed Petri dishes to gamma radiation or by placing the packaged and assembled Petri dishes in a container which is flooded with ethylene oxide gas for several hours. The cost associated with such sterilization procedures is on the order of $6.50 per 500 assemblies. This cost represents a significant portion of the product's overall cost. Typical costs for the resin material used to produce the Petri dish components is about $8.50 per 500 assemblies.

Improvements in overall production could be obtained if these problems could be eliminated or overcome.

Accordingly, it is an object of the present invention to provide a process and apparatus for forming injection molded components and for assembling these components into a desired article immediately after demolding.

It is a further object of the present invention to provide a process and apparatus as above which eliminates the need for separate assembling machines and sterilization equipment.

It is yet a further object of the present invention to provide a process and apparatus as above which decreases the cost for producing injection molded article.

These and further objects and advantages of the present invention will become clearer from the following description and drawings in which like reference numerals depict like elements.

SUMMARY OF THE INVENTION

The present invention overcomes many of the foregoing problems and achieves the foregoing objects and advantages by assembling the parts, immediately after demolding, in the molding machine itself. As a result, there is no need for a separate assembling machine. There is also no need for separate sterilization equipment in the manufacture of Petri dishes because the relatively sterile condition of the freshly molded parts is preserved during the relatively short time it takes to package the articles. In this regard, the present invention takes advantage of the discovery that freshly molded parts are virtually sterile.

The apparatus of the present invention preferably comprises an injection molding machine and a stack mold having a stationary mold half, a movable central portion, and a movable mold half. The machine has particular utility in the formation of a plurality of molded complementary parts such as bases and covers for a Petri dish. Each mold half has a part handling system including a plurality of suction cups pivotably mounted thereto by a pair of rotatable bar assemblies. The suction cups move between an inboard position in which they grasp the freshly molded parts and an outboard position in which they are aligned with a series of ports in the central portion to facilitate assembly of the parts into a desired article. A gear, rack and cam drive assembly is used to rotate the suction cups and the bar members between the inboard and outboard positions.

After insertion into the ports, the molded parts on a first side of the central portion are mated with complementary parts formed on a second side of the central portion to form an assembled article. For example, the Petri dish covers are mated with the bases. The assembled articles are then removed from the suction cups and are transferred to a conveyor by internal chute assemblies. In a preferred embodiment, the chute assemblies are machined inside the center section of the central portion.

The process of the present invention broadly comprises providing mold means having a central mold portion with at least one mold cavity along each of its two faces and two mating mold halfs each having at least one mold core element; substantially simultaneously forming at least one first part and at least one complementary second part; and assembling an article by mating said at least one first part with said at least one complementary second part within said central mold portion.

Further details of the apparatus and process will be described hereinafter.

DETAILED DESCRIPTION OF THE PREFERRED EMBODIMENT(s)

Figure 1:
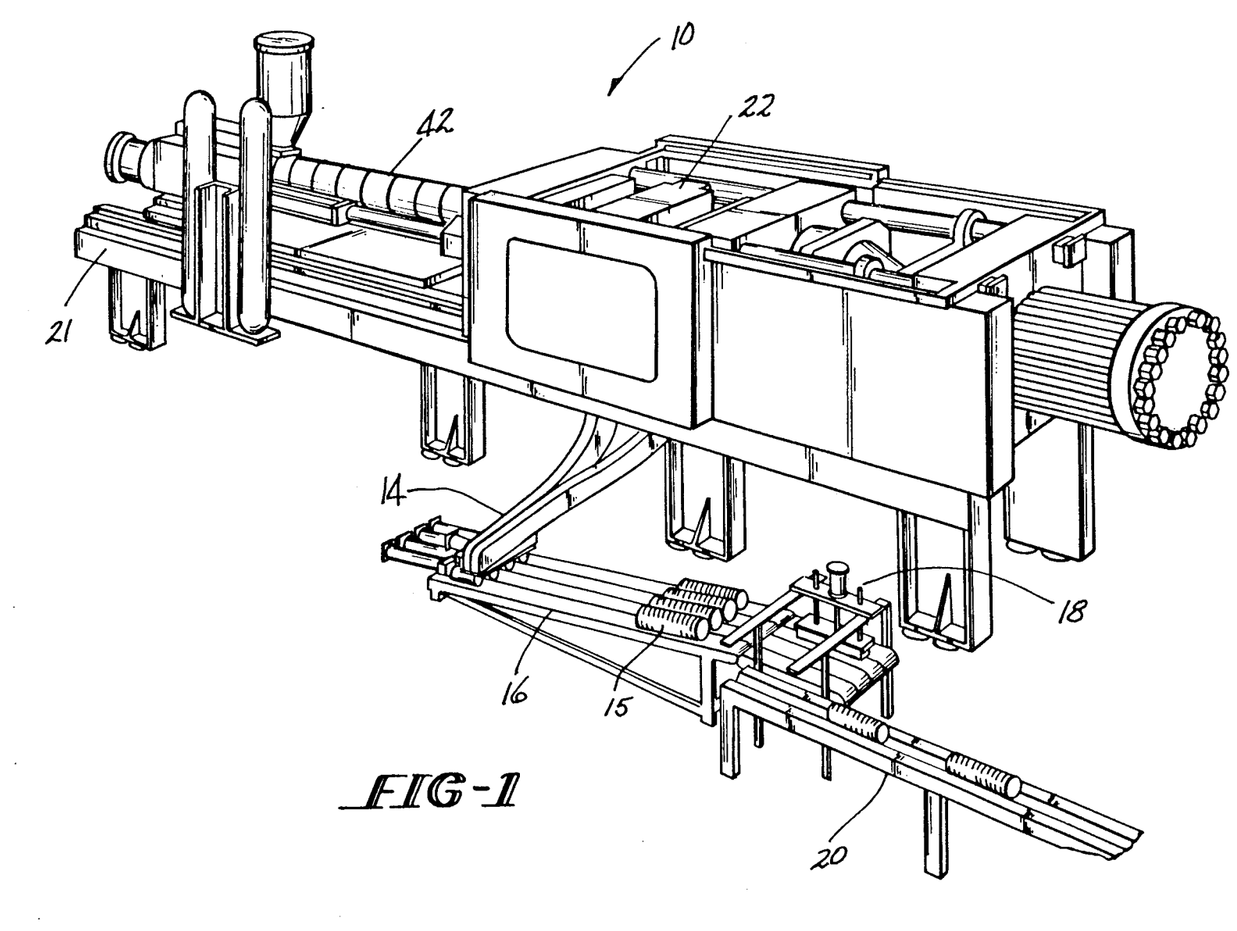
FIG. 1 is a perspective view of the injection molding machine of the present invention.
Figure 2:
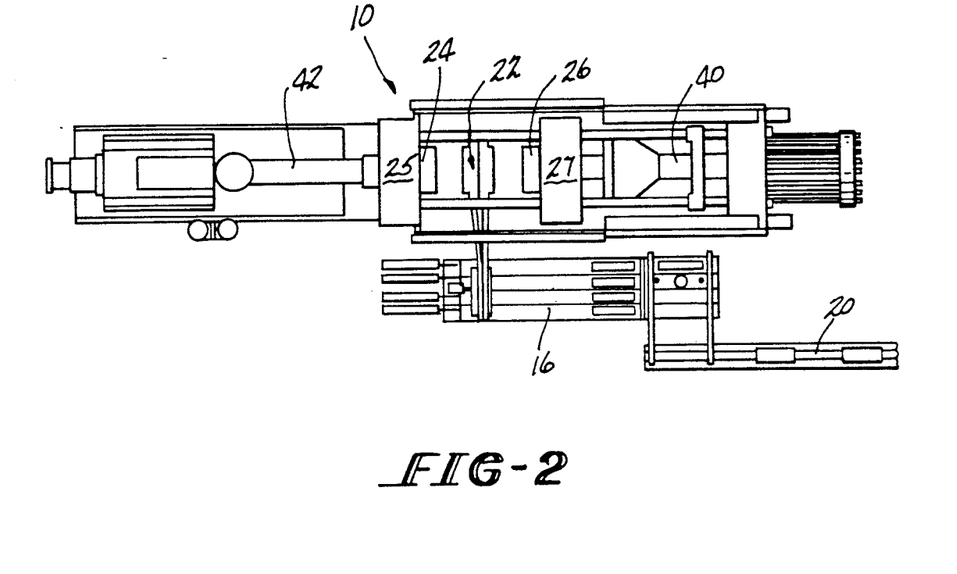
FIG. 2 is a top view of the injection molding machine of FIG. 1.
Figure 3:
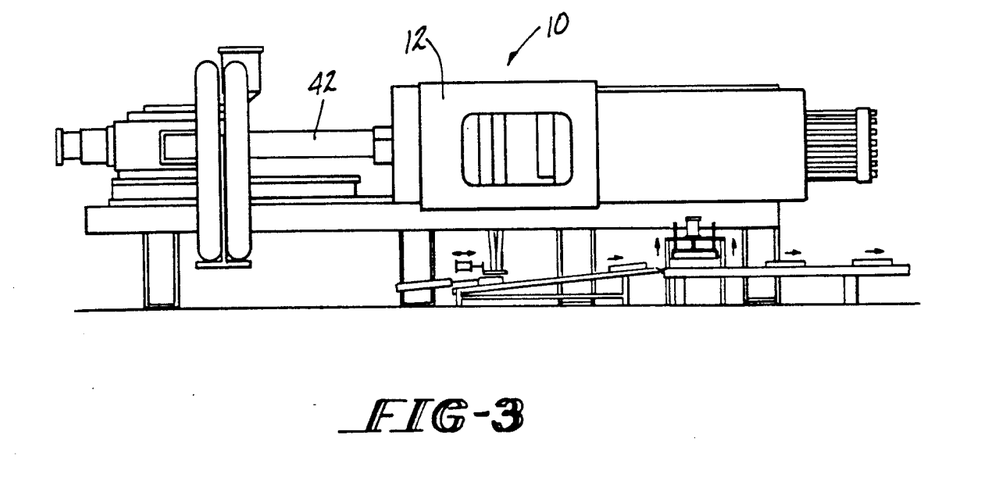
FIG. 3 is a side view of the injection molding machine of FIG. 1.

Referring now to the Figures, the molding system 10 of the present invention is illustrated in FIGS. 1–3. The system 10 includes an injection molding machine 12, chutes 14 for collecting and guiding assembled articles 15 leaving the mold machine, a conveyor 16 for stacking the assembled articles into two or more rows, a transfer station 18 for combining the rows of assembled articles into a single row, and a take-away conveyor 20.

The injection molding machine is mounted to a base 21 and includes a central mold portion or member 22, a stationary mold core half 24 attached to a stationary platen 25 and a movable mold core half 26 attached to a movable platen 27. The central portion 22 may comprise a family stack mold having a plurality of cavities 28 and a plurality of loading ports 29, one port for each cavity, on each of its faces 32 and 34. Each of the mold halfs 24 and 26 has a number of core elements 30 equal to the number of cavities 28 in the respective face 32 and 34 with which it mates.

During a single molding cycle, the core elements 30 on mold half 24 and the cavities 28 on face 32 of central mold portion 22 form a first part 64 while the core elements 30 on the mold half 26 and the cavities 28 on face 34 of the central mold portion form a second complementary part 66. The parts 64 and 66 when assembled form the article 15.

This type of injection molding apparatus has particular utility in the manufacture of Petri dishes where the parts 64 and 66 are respectively the bases and covers of the petri dishes. In such a system, the central mold portion 22 may have a 2×8 configuration for manufacturing eight bases and eight covers during a single molding cycle.

The movable central mold portion 22 and the platen 27 are slidably supported on upper and lower tiebars 36 and 38. Any suitable means known in the art such as the support elements shown in either U.S. patent application Ser. No. 274,469, filed Nov. 21, 1988, to DiSimone et al. or U.S. Pat. No. 4,408,981 to Brown, which are hereby incorporated by reference herein, may be used to support the central mold portion 22 on the tiebars 36 and 38. The platen 27 may carry pads 31 which slide on the lower tiebars 38.

The platen 27 and its attached mold core half 26 are reciprocably moved along the tiebars between mold open and mold closed positions by a ram 40 in a well known conventional manner. The central mold portion 22 is reciprocably moved through the use of a rack and gear drive arrangement not shown. This rack and gear arrangement may comprise the drive arrangement shown in the aforementioned DiSimone et al. application or that in the aforementioned Brown patent or any other suitable arrangement.

When the molds are in their mold closed position, the core elements 30 and the cavities 28 define a plurality of cavity spaces in the shapes of the parts to be formed. Flowable plastic material may be introduced into these cavity spaces in any suitable manner known in the art. For example, plastic material may be introduced in at least some of the cavity spaces through an injection channel 42 traversing the platen 25. The remaining cavity spaces may be supplied with plastic material via an extension not shown of channel 42 which communicates with either central mold portion 22 or platen 27. Alternatively, a series of reciprocable nozzle openings not shown in the central mold portion may be used to supply the plastic material to the cavity spaces.

Figure 4:
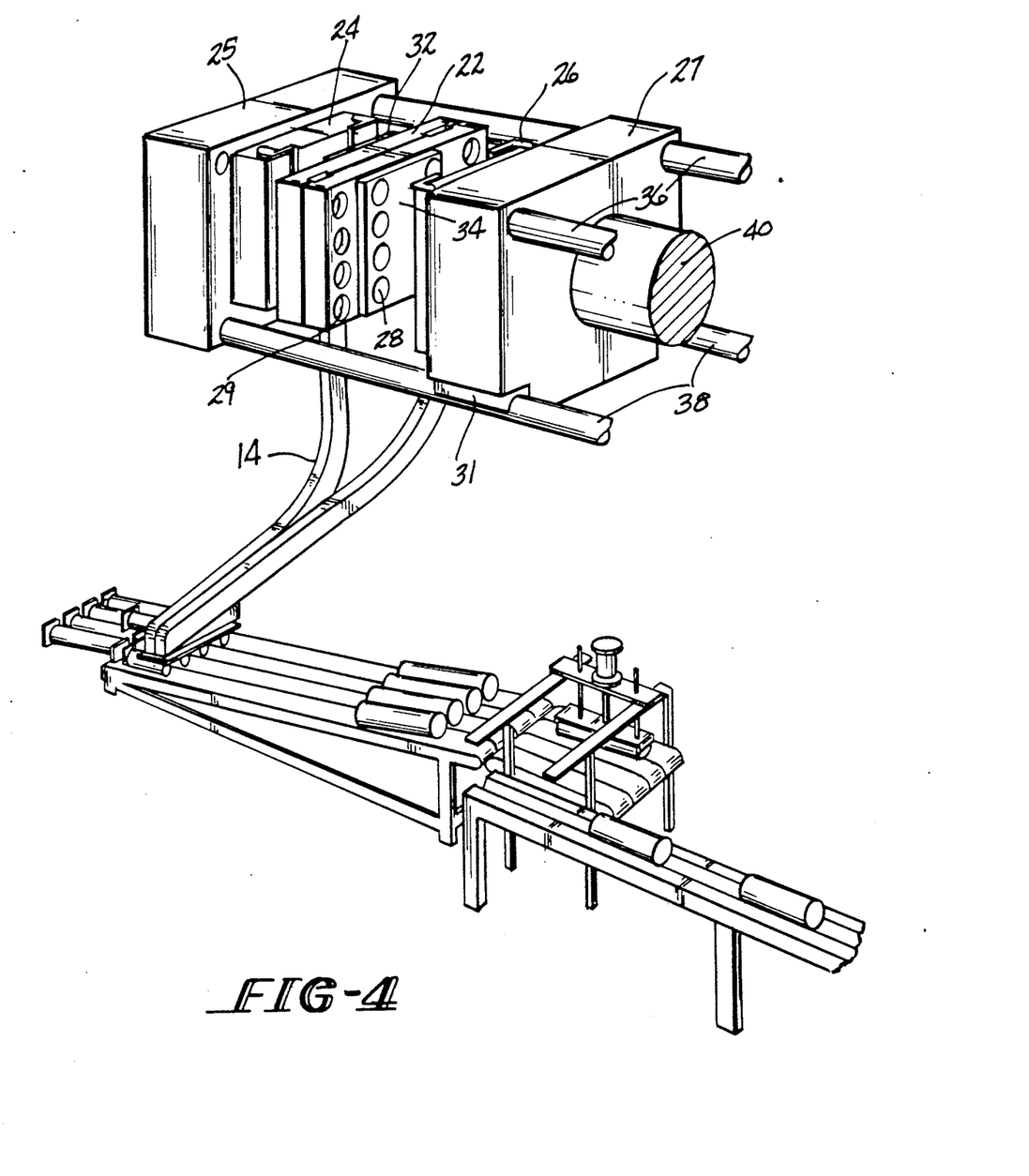
FIG. 4 broadly illustrates a molding machine with the handling system of the present invention.
Figure 5:
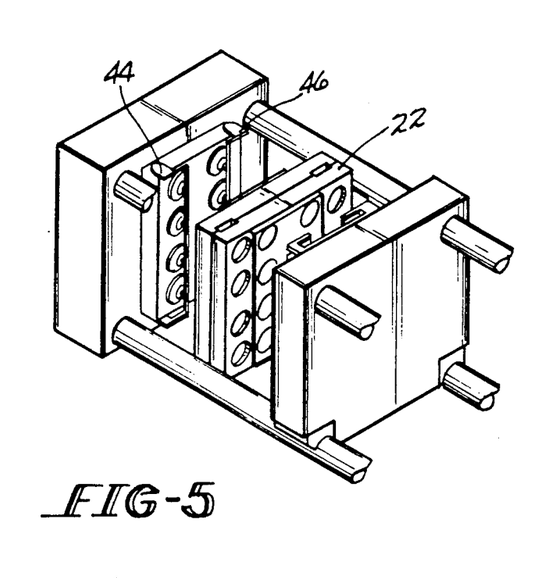
FIG. 5 shows the molding machine in a mold open position.

To remove the freshly molded parts 64 and 66 from the core elements and position them for later assembly into the article 15, each mold core half 24 and 26 is provided with a support frame 70 bolted to the top of a core plate 72 for supporting an article handling system 43. The handling system comprises two substantially C-shaped bar members 44 and 46 pivotably mounted to the support frame 70 by shafts 74 along two opposed sides of the mold half. The system 43 further comprises a plurality of suction cups 48 attached to each bar member There is usually one suction cup per mold core element although more than one per core element may be provided if desired.

Each suction cup 48 contains an aperture not shown through which a vacuum may be applied to assist in holding the part 64, 66 to the cup(s). Any suitable means known in the art may be used to apply the vacuum. For example, the arms 49 supporting the suction cups may have passageways not shown and a fitting not shown for connecting the passageways to a vacuum source not shown such as a vacuum pump. Suitable means (not shown) known in the art may be provided to switch off the vacuum as required such as when the machine is in a mold closed position.

As shown in FIGS. 5-8 and 15, the bar members 44, 44', 46 and 46' and the suction cups 48 are rotated through an approximate 180° arc between an inboard position and an outboard position with the bar members of each set being rotated in opposite directions. The cups 48 in the inboard position contact and firmly grasp an exterior surface of the freshly molded parts 64 and 66. When the cups are in their outboard position, they align the parts 64 and 66 with the aligned loading ports 29 in the faces 32 and 34 of the central mold portion 22.

The bar members and suction cups are rotated or pivoted between the inboard and outboard positions by a gear, rack, and cam drive arrangement such as that shown in FIGS. 12-15. As shown therein, each of the bar members 44, 44', 46 and 46' carries a gear 50 mounted to a respective shaft 74. Each gear 50 is driven by a respective sliding rack member 52 attached to a respective block 54 movably supported on the support frame 70. Each rack member 52 slides through a gib 76 which keeps it in contact with gear 50.

Movement of each block 54 is dictated by a cam plate 58 having profiled portions 80 mounted to the central mold portion 22 by a bridge support 78 and a cam follower 56 mounted to each block. The support 78 is designed so that portions of the handling system mounted to the core halfs can pass underneath cam plate 58. To insure contact between each cam follower 56 and a respective cam profile 80 at all times, a fluid cylinder 60 is mounted to each support frame 70. The fluid cylinder 60 has a rod end 62 attached to the block 54 so as to urge the cam follower 56 against the cam profile 80.

As the mold core half 26 and the central mold portion 22 move relative to the stationary mold half 24, the cam followers 56 and cam profiles 80 move relative to each other. The blocks 54 move according to the cam profiles Since the racks 52 are rigidly affixed to the blocks 54, they move in the same direction as the block. It should be noted that for each pair of bar members 44 and 46, a first rack 52 is attached to one side of the block 54 while the other rack 52' is attached to an opposite side of the block. This is to insure proper movement of the bar members and suction cups between the inboard and outboard positions.

Figure 6:
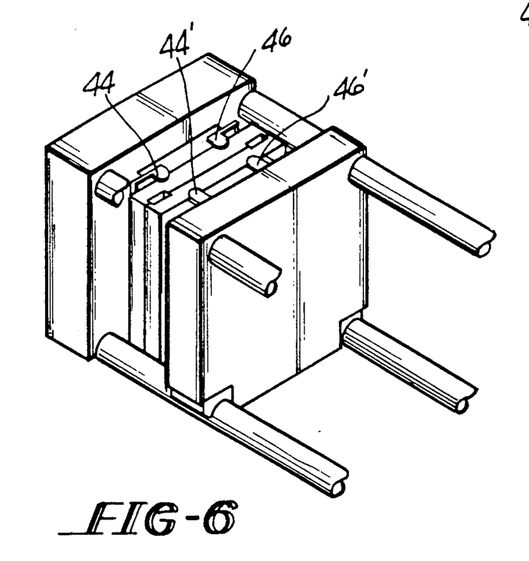
FIG. 6 shows the molding machine in a mold closed position.
Figures 7, 8:
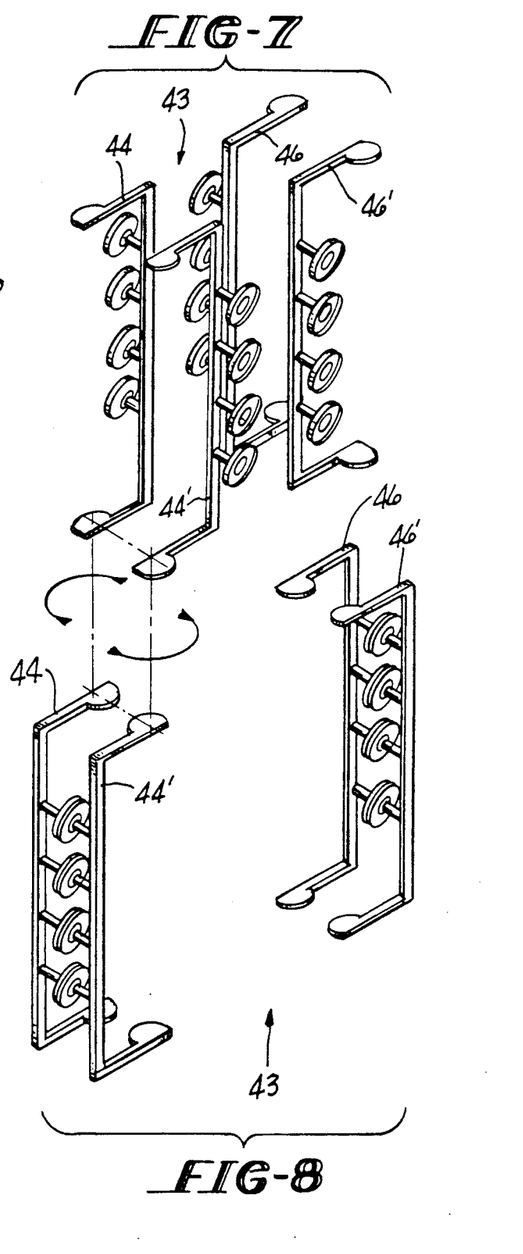
FIG. 7 shows the suction cup handling system for removing parts in a mold open position.
FIG. 8 shows the suction cup handling system in a mold closed position.
Figure 9:
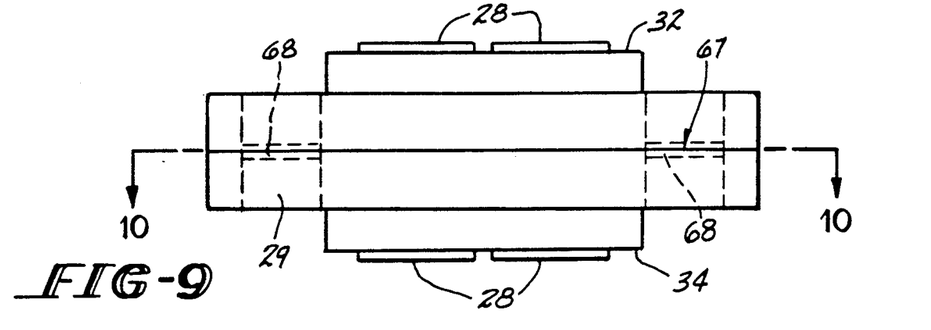
FIG. 9 shows a top view of the central mold portion without the attached cam plate.

When the molds are closed, the bar members and suction cups are in the outboard position shown in FIGS. 6 and 8 and the cam followers 56 are positioned against the straight portion of the cam plate 58. As the mold begins to open, the cam followers 56 and the cam plate 58 move relative to each other. When the cam followers 56 contact the curved profiled portions 80 of the cam plate 58, movement of each block 54 occurs. This in turn causes a sliding movement of the rack(s) 52, 52' and a corresponding rotation of the gears 50 contacted by the racks. Rotation of the gears causes the bar members and the cups to rotate inwardly to their inboard position. When the cups reach their inboard position, they contact the freshly molded parts 64 and 66. The parts 64 and 66 are then ejected from the mold core elements 30 by suitable ejection means (not shown) known in the art such as ejection pins and/or stripper plates. As the mold begins to close for the next molding cycle, the cam followers 56 move along the curved profiled portions 80 toward the straight portions 82. This again causes a sliding movement of each block 54, rotation of the gears 50 and outward rotation of the cups 48 with the attached parts. The cups 48 due to the length of the curved portions of the profile reach their outboard position before the mold fully closes.

Figure 14:
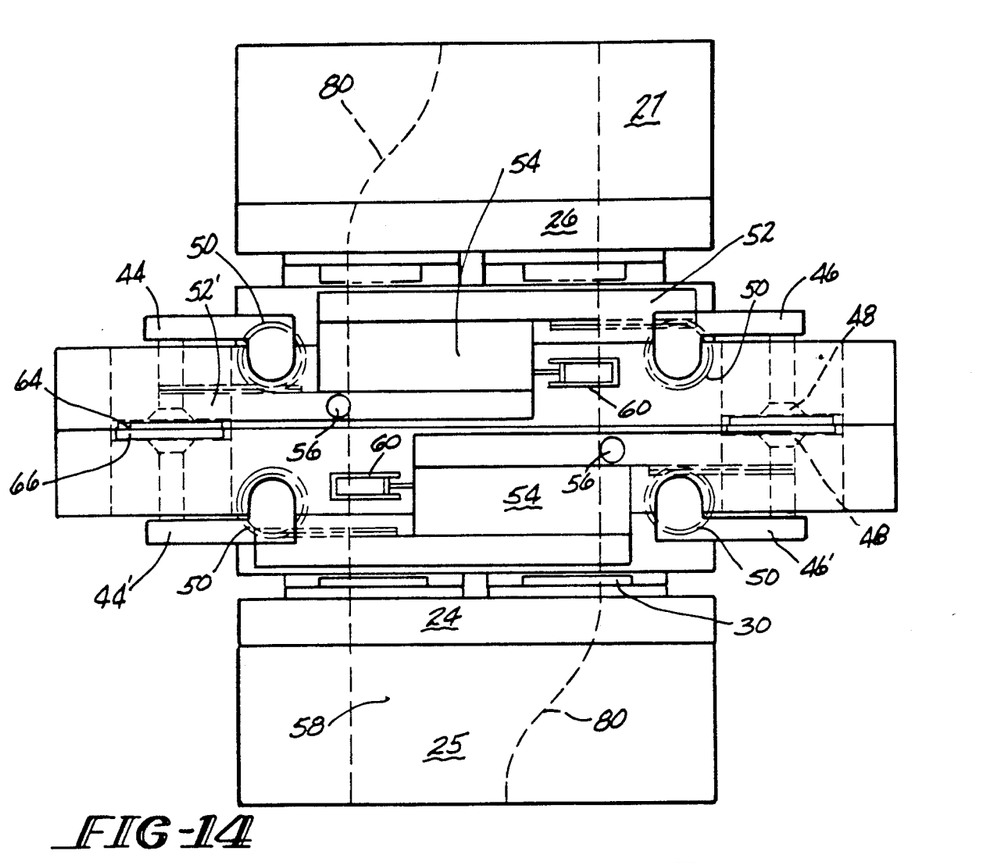
FIG. 14 is a top view of the handling system of the present invention with the attached cam plate in dotted lines.
Figure 15:
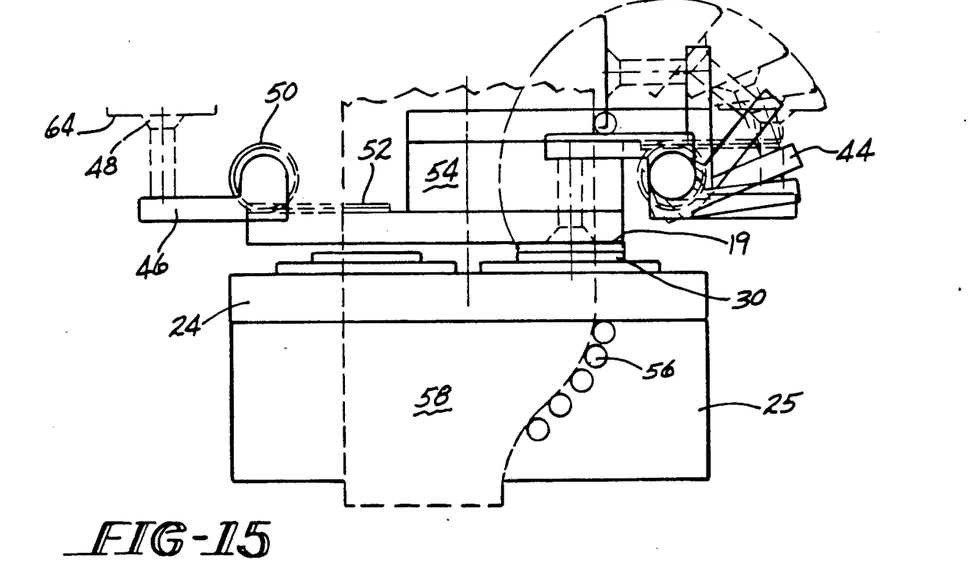
FIG. 15 illustrates the track of the suction cup handling system of the present invention.

As shown in FIG. 14, the cups 48 and the attached parts 64 and 66 in the outboard position are aligned with the loading ports 29 on each side of the mold 22. As the mold continues to close, the parts 64 and 66 attached to the cups 48 are inserted into the aligned ports 29 and into a central portion 67 of the stack mold member 22 from both sides of the stack mold. When the mold is in its fully closed position, the parts 64 and 66 mate with each other in the central portion 67 as shown in FIGS. 8 and 14 to form the assembled article 15.

Figure 10:
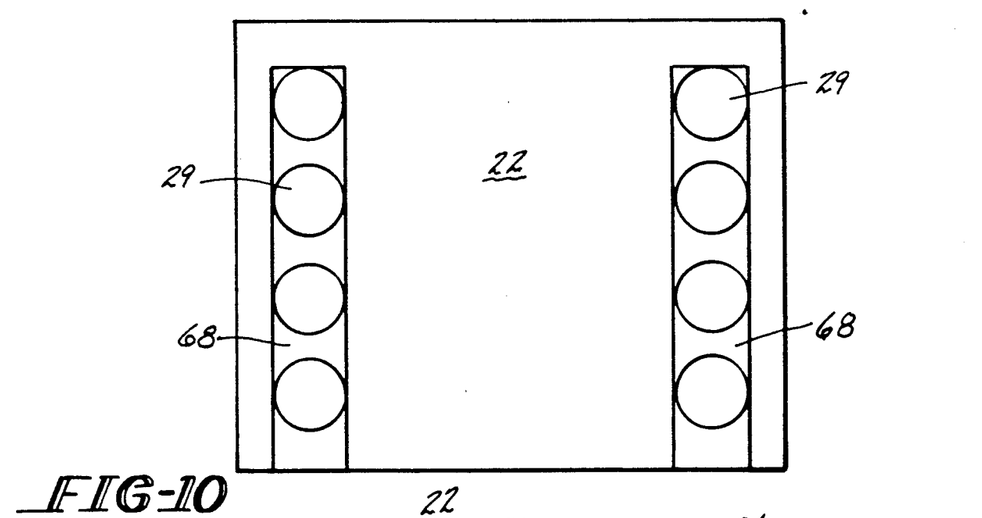
FIG. 10 shows a sectional view of the central mold portion taken along lines 10—10 in FIG. 9.
Figure 11:
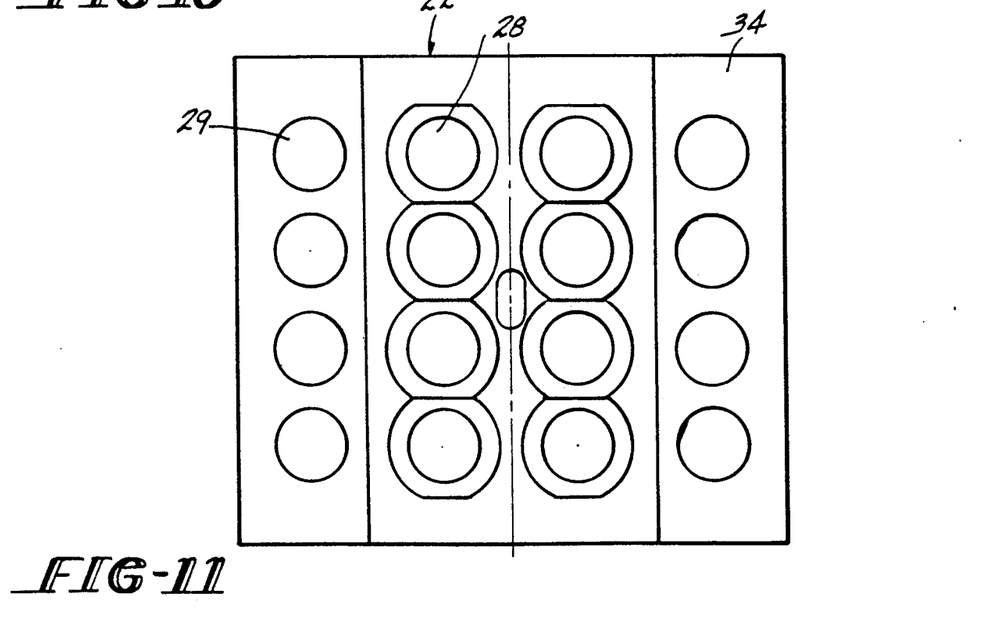
FIG. 11 is a view of a face of the stack mold of FIG. 9 without the attached cam plate.
Figure 12:
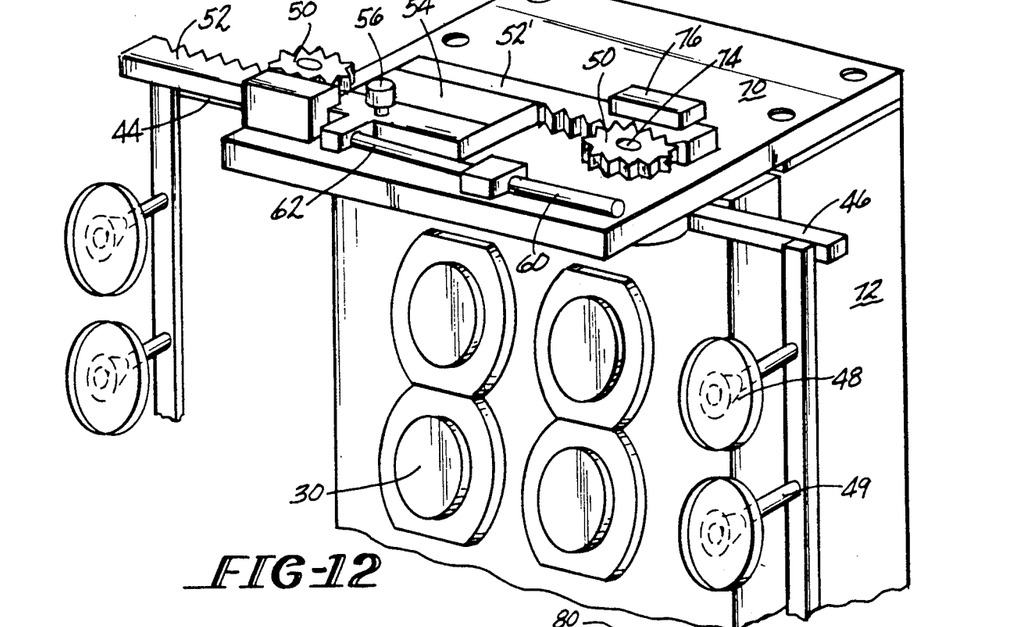
FIG. 12 is a perspective view of a mold core half with the handling system of the present invention.
Figure 13:
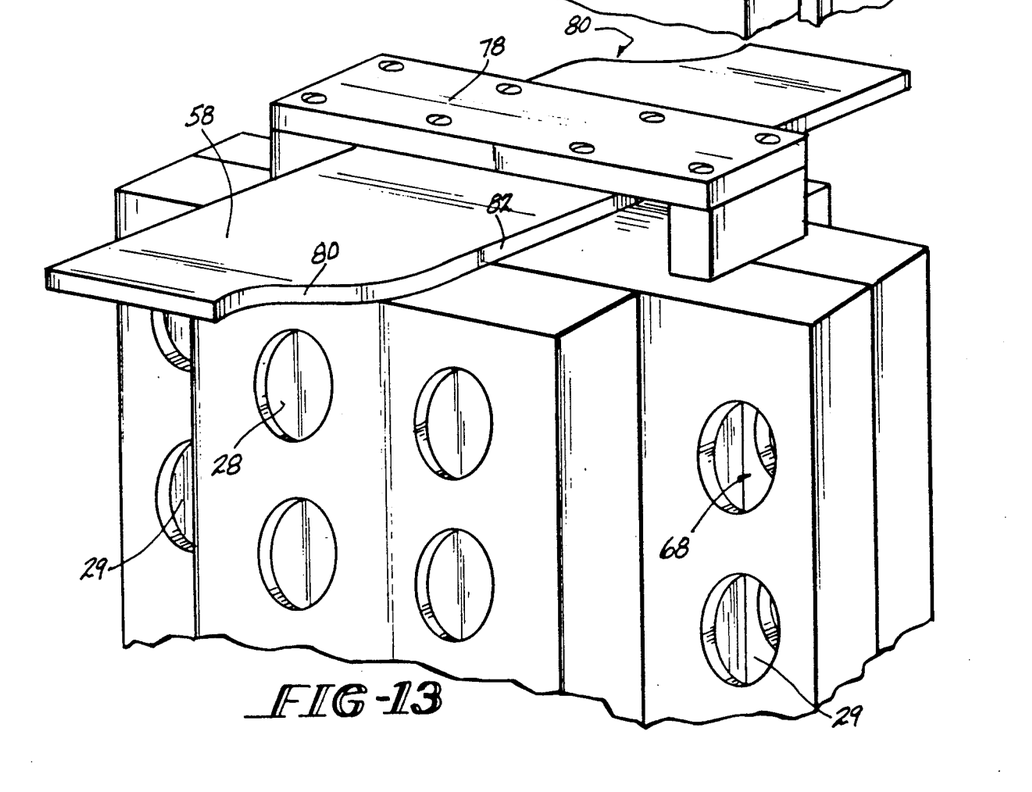
FIG. 13 is a perspective view of a central mold portion with a cam plate mounted thereto.

As shown in FIG. 10, the central portion 67 of the stack mold has two chutes 68 machined along two sides of the mold. The assembled articles are dropped into the chutes 68 by discontinuing the vacuum applied through the cups 48. As previously discussed, switch means not shown actuated by closure of the mold may be provided to discontinue the vacuum.

The chutes 68 are aligned with the chutes 14 when the mold is in the closed position. The assembled articles 15 then drop into the chute 14 and are deposited onto the conveyor 16. From there, the articles are sent to a packing station not shown via conveyors 18 and 20.

As mentioned above, the molding system of the present invention has particular utility in the manufacture and assembly of Petri dishes. In such a system, the parts 64 and 66 may respectively be the covers and the bases. Since the interior surfaces of the freshly molded covers and bases are not contacted during handling and assembly portions of the molding cycle and since the bases are mated to the covers in a relatively short time period, the sterile condition of the freshly molded interior surfaces should be maintained. As a result, there should be no need for additional sterilization equipment.

It can also be seen from the foregoing disclosure that a separate assembly machine is no longer required. As a result, the jamming delays which occur in other systems will not occur in the present system. Substantial time and cost savings are thus effected.

While the instant invention has particular utility in the manufacture of Petri dishes, it also has application in the manufacture of other two-part articles.

It should also be recognized that the central mold portion may have any number of cavities on each face arranged in one or two parallel rows. Where the cavities are arranged in one row, one of the bar members and suction cups and the attendant drive components could be removed.

It is apparent that there has been provided in accordance with this invention an unloading and assembly device for use with injection molding machines which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for forming an injection molded article from two complementary parts, said process comprising:
providing mold means having a central mold member with at least one mold cavity in each of its two faces and two mating mold halves each having a mold core element in a face;

substantially simultaneously forming at least one first part and at least one complementary second part in said mold means; and mating said at least one part with said at least one complementary second part within said central mold member to form said article.

2. A process according to claim 1 further comprising:

removing said first and second parts from between said mold halves and said central mold member as said mold means moves from a mold open position to a mold closed position;

aligning said parts with loading ports in opposed faces of said central mold member; and inserting said parts into said loading ports as said mold means nears said mold closed position.

3. The process of claim 2 wherein said mating step comprises mating a respective first part inserted into a first one of said loading ports with a respective second part inserted into a second one of said loading ports aligned with said first loading port.

4. The process of claim 2 wherein:

said removing step comprises placing at least one suction cup into contact with each of said first and second parts and rotating each said cup; and said aligning step comprises moving each said cup and its attached part into alignment with one of said loading ports.

5. A process for forming an injection molded article from two complementary parts, said process comprising:

providing an injection molding apparatus having a central mold member with at least one mold cavity in each of its two faces and two mating mold halves each having a mold core element in a face;

substantially simultaneously forming at least one first part and at least one complementary second part in said molding apparatus; and mating said at least one part with said at least one complementary second part in an internal region of said central mold member when said molding apparatus is in a mold closed position.

6. An apparatus for forming an assembled article from two injection molded parts, said apparatus comprising:

means for substantially simultaneously forming a first injection molded part and a second complementary injection molded part;

means for assembling said first and second parts into said article;

said assembling means being located within said forming means; and means for unloading said first and second parts when said forming means is in a first portion of a molding cycle and for inserting said first and second parts into said assembling means when said forming means is in a second portion of said molding cycle.

7. The apparatus of claim 6 wherein:

said forming means includes a central mold member having two opposed faces; and said assembling means comprises at least one port in each said face of said central mold member into which said parts to be assembled into said article are inserted.

8. The apparatus of claim 7 wherein said central mold member has a central portion in which said first part is mated with said second part, said central portion having at least one chute assembly machined therein for transporting said assembled article away from said mold member.

9. The apparatus of claim 8 further comprising:

a conveyor for stacking said assembled articles in at least two rows;

a transfer station for combining said at least two rows of assembled articles into a single row; and a take away conveyor for transporting said single row of assembled articles.

10. An apparatus for forming an assembled article from two injection molded parts, said apparatus comprising:

means for substantially simultaneously forming a first injection molded part and a second complementary injection molded part;

means for assembling said first and second parts into said article;

said assembling means being located within said forming means;

means for unloading said first and second parts when said forming means is in a first portion of a molding cycle and for inserting said first and second parts into said assembling means when said forming means is in a second portion of said molding cycle;

said forming means including a central mold member having two opposed faces;

said assembling means comprising at least one port in each said face;

said forming means further including two mold halfs with a first one of said mold halfs being positioned opposite a first face of said central mold member and a second one of said mold halfs being positioned opposite a second face of said central mold member; and said unloading and inserting means comprising a handling system pivotably mounted to each said mold half.

11. The apparatus of claim 10 wherein said handling system comprises at least one bar member pivotably connected to a respective one of said mold halfs and at least one suction cup attached to said bar member.

12. The apparatus of claim 10 wherein said handling system comprises two substantially C-shaped bar members pivotably connected to a respective one of said mold halfs and at least one suction cup attached to each said bar member.

13. The apparatus of claim 12 wherein each said mold half has at least two core members and the handling system has a number of suction cups equal to the number of core members.

14. The apparatus of claim 12 further comprising:

drive means for rotating said bar members and said suction cups between an inboard position for unloading said first or second part and an outboard position for aligning said second or first part with said at least one port.

15. The apparatus of claim 14 wherein said drive means comprises:

gear means associated with each said bar member;

rack means for driving each said gear means; and cam means for driving said rack means.

16. The apparatus of claim 15 further comprising:

a movable block member mounted to each said core half;

said rack means comprising two rack members mounted to each said block member; and said cam means comprising a cam plate attached to said central mold member and a cam follower attached to each said block member, whereby said cam followers and said cam plate move relative to each other as said forming means moves through said molding cycle and whereby movement of said cam followers along said cam plate causes movement of said block members and said racks and rotation of said gear means.

17. The apparatus of claim 16 wherein said drive means further comprises fluid cylinder means for maintaining contact between said cam followers and said cam plate.

18. An apparatus for forming a plurality of assembled articles from a plurality of molded parts, said apparatus comprising:
    molding means for forming a plurality of first parts and a plurality of mating second parts during a single molding cycle;
    said molding means comprising first and second mold halfs each having a plurality of core elements and a central mold member positioned intermediate said mold halfs;
    said central mold member having a first face opposed to said first mold half and a second face opposed to said second mold half;
    each said face having a plurality of cavities aligned with said core elements on one of said first and second mold halfs;
    each said face further having a plurality of loading ports with the number of the ports being equal to the number of cavities therein, the loading ports in said first face being aligned with the loading ports in said second face;
    said first and second mold halfs and said central mold member moving relative to each other between a mold open position and a mold closed position during which said first and second parts are formed; and
    handling means for grasping said first and second parts during said mold open position, for removing said first and second parts from between respective ones of said mold halfs and said stack mold member, and for assisting in assembling said first parts to said second parts.

19. The apparatus of claim 18 further comprising:
    said handling means including a plurality of suction cups for contacting said first and second parts and means for rotating said suction cups between an inboard position where said cups contact said parts and outboard position wherein said cups are aligned with said loading ports.

20. The apparatus of claim 18 wherein said first parts and said second parts are inserted into said loading ports in said first and second faces and are assembled in a central portion of said central mold member communicating with said loading ports.

21. The apparatus of claim 20 wherein said central portion has at least one integral internal chute assembly for conveying assembled articles away from said central mold member.

22. The apparatus of claim 20 wherein said central mold member has eight cavities aligned in two rows and eight loading ports in each face and each mold half has eight core elements.

23. A system for unloading parts from an injection molding apparatus having a mold half and a mating mold member, said system comprising:
    means for contacting and removing said parts from between said mold half and said mating mold member;
    means for driving said contacting and removing means;
    said driving means comprising at least one rotatable member supporting said contacting and removing means mounted to said mold half and gear means affixed to said at least one rotatable member;
    said driving means further comprising a cam plate attached to said mating mold member and a movable block mounted to said mold half; and
    said movable block having rack means contacting said gear means and a cam follower for contacting said cam plate;
    whereby movement between said mold half and said mating mold member causes relative movement between said cam follower and said cam plate which in turn causes movement of said block member and said rack means so as to cause rotation of said gear means, said at least one rotatable member and said contacting and removing means.

24. The system of claim 23 wherein:
    said contacting and removing means comprises at least two suction cups;
    said drive means including two bar members mounted to said mold half;
    each said bar member having at least one suction cup and a gear attached thereto; and
    said drive means further including two racks for engaging said gears,
    whereby movement of said block causes a first of said bar members to rotate in one direction and a second of said bar members to rotate in a second direction opposite to said first direction.

25. An apparatus for forming an assembled article from two injection molded parts, said apparatus comprising:
    means for substantially simultaneously forming a first injection molded part and a second complementary injection molded part;
    means for assembling said first and second parts into said article;
    said assembling means being located within said forming means;
    said forming means including a central mold member having two opposed faces;
    said assembling means including an internal region of said central mold member wherein said first injection molded part is mated with said second injection molded part; and
    at least one internal chute assembly within said central mold member for transporting assembled articles away from said mold member.

* * * * *